Feb. 9, 1943.   R. O. EASTIN   2,310,355
CREAM SEPARATOR
Filed July 14, 1941
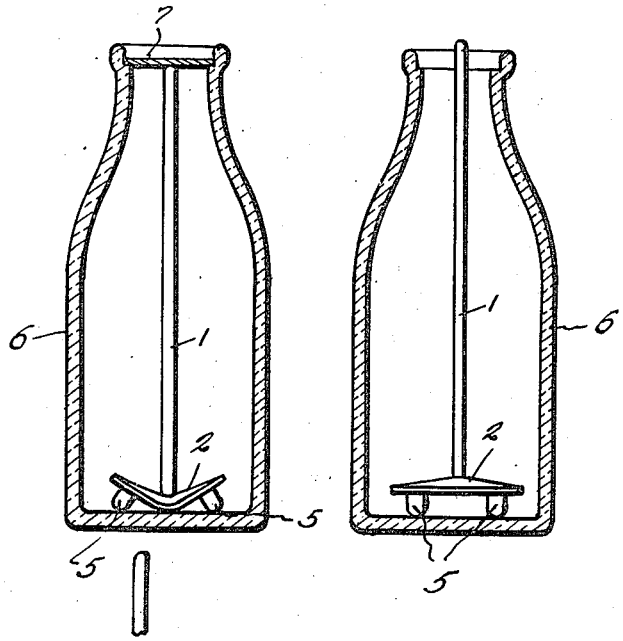
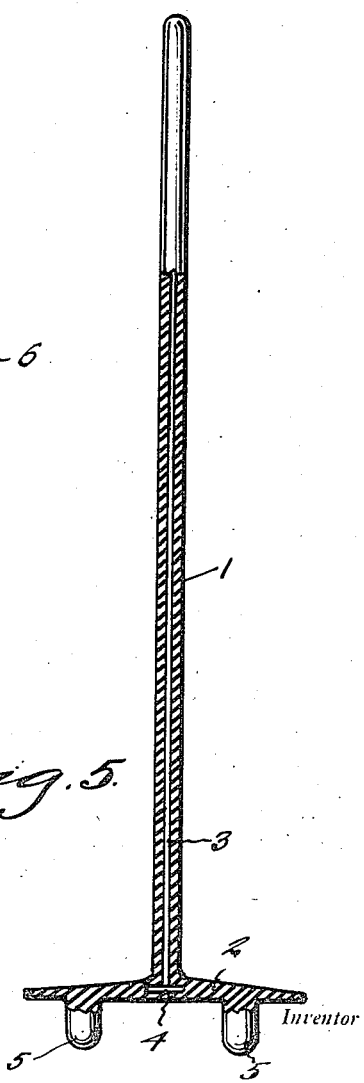
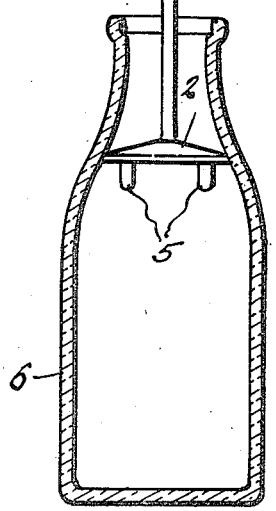
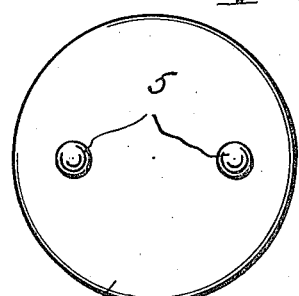
Inventor
Ralph O. Eastin
By Clarence A. O'Brien
Attorney Patented Feb. 9, 1943

2,310,355

UNITED STATES PATENT OFFICE 2,310,355

CREAM SEPARATOR

Ralph O. Eastin, Mountain Grove, Mo.

Application July 14, 1941, Serial No. 402,405

2 Claims. (Cl. 210—51.5)

The present invention relates to new and useful improvements in cream separators and has for its primary object to provide, in a manner as hereinafter set forth, a device of this character which is adapted to be placed in a milk bottle and remain therein after said bottle has been filled and capped.

Another very important object of the invention is to provide a cream separator of the aforementioned character which will immediately present itself for use when the milk bottle is opened by the consumer.

Other objects of the invention are to provide a cream separator of the character described which will be comparatively similar in construction, strong, durable, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical section through a closed milk bottle, showing a cream separator constructed in accordance with the present invention in position therein.

Figure 2 is a view in vertical section through an open milk bottle, showing the device of my invention therein.

Figure 3 is a view in vertical section through an open milk bottle, showing a cream separator in accordance with the present invention elevated to operative position therein.

Figure 4 is a view principally in vertical section through the separator.

Figure 5 is a bottom plan view of the device.

Referring now to the drawing in detail, it will be seen that the embodiment of the invention which has been illustrated comprises a stiff stem 1 of rubber or other suitable material. On the lower end of the stem 1 is resilient or bendable disk 2 which is also of rubber or any other suitable material.

The stem 1 encloses a stiffening or reinforcing rod 3. On the lower end of the rod 3 is a comparatively small disk 4 which is molded in the disk 2.

Depending from the disk 2 is a pair of spaced, integral nubs or the like 5. The stem 1, it will be noted, rises from the disk 2 at a point intermediate the nubs 5.

The device is adapted to be inserted in a conventional milk bottle 6. When thus inserted, the length of the device is such that the stem 1 protrudes above the top of the bottle. After the separator is inserted in the bottle said bottle is filled and the usual cap 7 is placed thereon. In this manner the stem 1 is forced downwardly in the bottle, and, as suggested in Figure 1 of the drawing, the disk 2 is flexed downwardly between the nubs 5 where it is held under tension. When the cap 7 is removed, the resilient disk 2 returns to its normal position thereby elevating the stem 1 and causing the upper end portion thereof to protrude above the top of the bottle where it may be conveniently gripped, as seen in Figure 2 of the drawing. Then, as shown in Figure 3 of the drawing, the separator is raised to elevate the disk 2 to the cream line in the bottle for permitting the cream to be poured off.

It is believed that the many advantages of a cream separator constructed in accordance with the present invention will be readily understood and although a preferred embodiment of the device is as illustrated and described, it is to be understood that changes in the details of construction may be resorted to which will fall within the scope of the invention as claimed.

What is claimed is:

1. A cream separator for insertion in a milk bottle comprising a resilient disk adapted to be inserted in the bottle, means on the disk for supporting same in elevated position on the bottom of the bottle, and a stem on the disk offset relative to the supporting means and adapted to flex said disk, said stem being of a length to protrude above the level of the contents of the bottle when the disk is unflexed.

2. A cream separator for insertion in a milk bottle comprising a resilient disk engageable in a bottle, spaced lugs depending from the disk for supporting said disk in elevated position on the bottom of the bottle, and a stem rising from the disk at a point intermediate the lugs and adapted to flex said disk downwardly between said lugs, said stem being of a length to protrude above the contents of the bottle when the disk is unflexed.

RALPH O. EASTIN.